Figure 1:
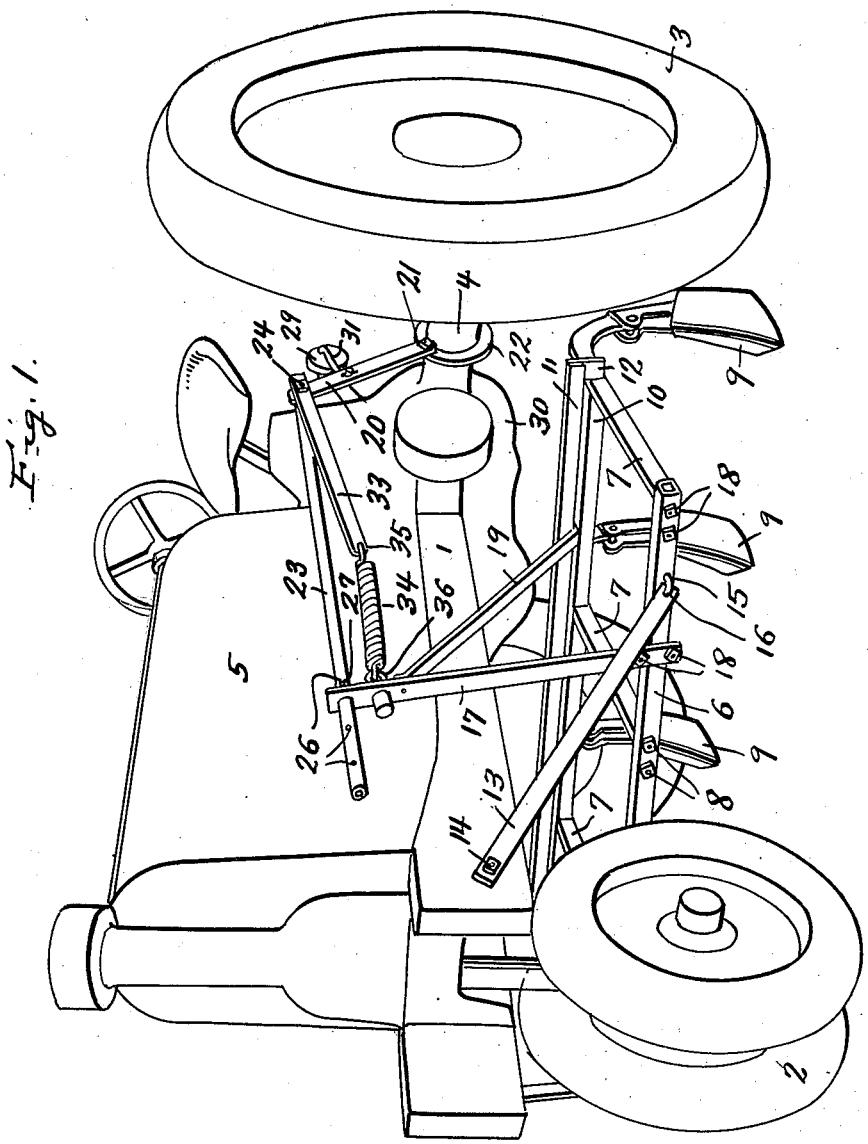

July 19, 1938.　　　　J. PANCHERI　　　　2,124,005
TRACTOR CULTIVATOR
Filed Aug. 5, 1937　　　　2 Sheets-Sheet 1

Inventor
Joseph Pancheri

By Clarence A. O'Brien
Hyman Berman
Attorneys

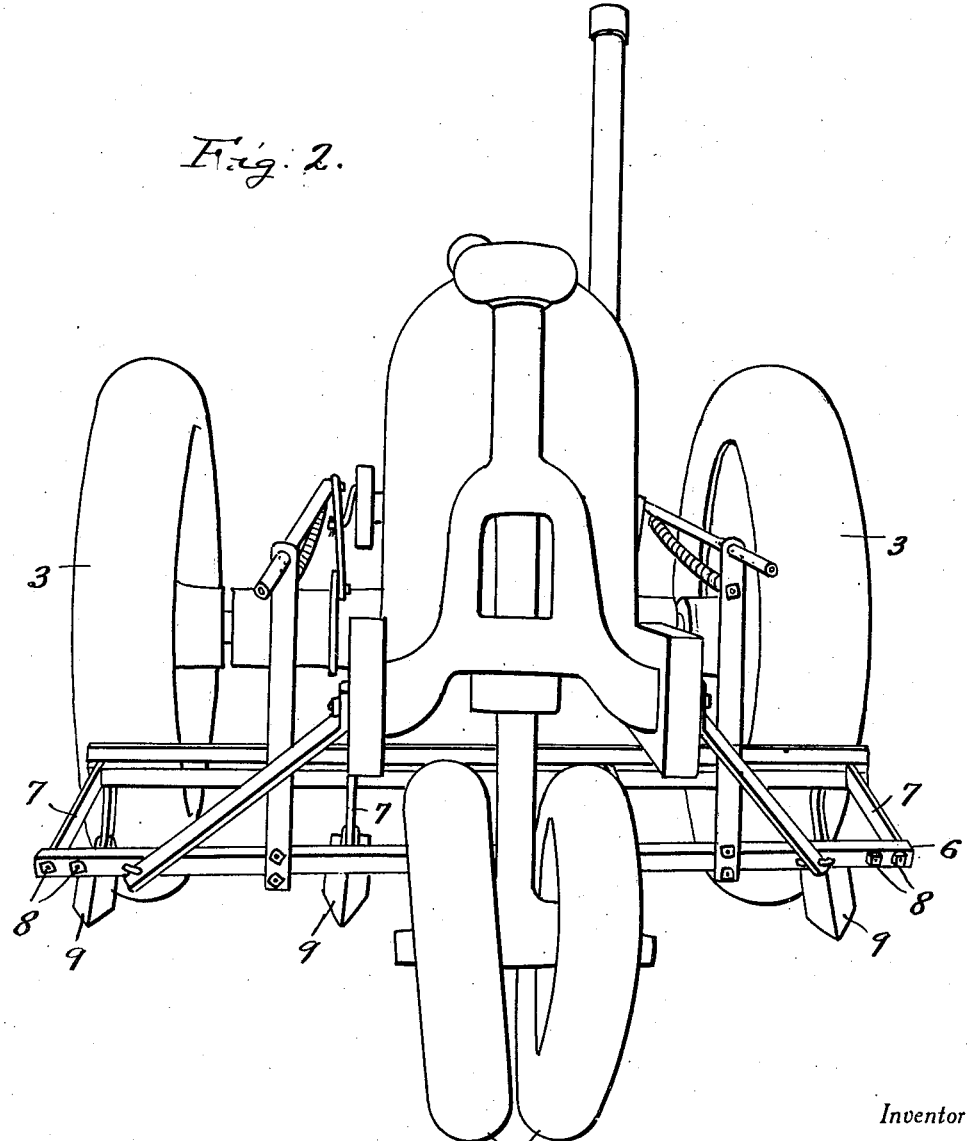

Patented July 19, 1938

2,124,005

UNITED STATES PATENT OFFICE 2,124,005

TRACTOR CULTIVATOR

Joseph Pancheri, Melba, Idaho

Application August 5, 1937, Serial No. 157,595

2 Claims. (Cl. 97—47)

My invention relates to improvements in tractor cultivators for use more particularly in performing so-called corrugating operations, well understood in the art, on irrigated lands.

The primary object of my invention is to equip a tractor of commercially known row crop type with simply constructed and efficient mechanism for performing such corrugating operations and particularly adapted for such operations close to fences and irrigating ditches.

Another object is to provide a tractor corrugator in which corrugating instrumentalities are power operated to elevate and lower the same as required.

To the accomplishment of the above and subordinate objects, presently appearing, a preferred embodiment of my invention has been illustrated in the accompanying drawings, set forth in detail in the following description, and defined in the claims appended hereto.

In the said drawings;

Figure 1 is a view in perspective of a row crop type tractor equipped according to my invention and viewed from one side of the machine, and Figure 2 is a similar view looking at the front of the machine.

Referring to the drawings by numerals, in the illustrated embodiment thereof, my invention has been shown as applied to a conventionally illustrated row crop cultivator and in which numeral 1 designates the chassis frame, 2 the front closely spaced pair of steering wheels, 3 the rear widely spaced tractor wheels, 4 the rear axle housing and 5 the power plant.

Beneath the chassis frame 1, and intermediate the front and rear wheels 2 and 3, is an implement rig, or frame, centered under said chassis frame and comprising a front bar 6 extending transversely of the tractor, and a plurality, in this instance four, of implement beams 7 extending rearwardly from the front bar 6 in parallel, equi-distantly spaced apart relation, with the front ends thereof bolted, as at 8, to said bar 6. The beams 8 are of the same length and each has suitably secured to its rear end a ground working implement 9 of the well-known cultivator type. A rear transverse brace bar 10 connects the beams 7 together adjacent the rear ends thereof. A similar bar 11 extends across the beams 7 parallel with and adjacent to brace bar 10 and with its ends connected to the outside beams 7 by brackets as at 12.

The described implement rig, or frame, is connected to the front end of the chassis frame 1 by a pair of draw bars 13 extending from opposite sides of said frame 1, respectively, and having their front ends 6 secured, as by bolts 14, to said frame 1. The draw bars 13 incline rearwardly from the chassis frame 1, downwardly and outwardly. The implement rig, or frame, is pivotally mounted at its front end on the rear ends of said draw bars 13 for vertical swinging movement thereon as by U bolts 15 on the front bar 6 passing through apertures 16 in said ends.

The implement rig, or frame, is designed to be swung vertically on said draw bars 13 to elevate or lower the implements 9 by means of the following.

A pair of bars 17 are secured to the front bar 6, as at 18, in upstanding position and upon opposite sides of the chassis frame 1 respectively. Each bar 17 is connected to the rear bar 11 by a brace bar 19. A pair of vertically disposed operating links 20 are pivoted, as at 21, to the usual flanges 22 on the rear axle housing 4, and at opposite sides of the chassis frame 1, respectively, to swing forwardly and rearwardly. Each operating link 20 is connected to the bar 17 on the same side of the chassis frame 1 by a rod 23 extending forwardly therefrom with its rear end pivoted, as at 24, to said link and its front end slidably mounted in an aperture 25 in the upper ends of the related bar 17. A removable pin 26 inserted in an aperture 27 in each rod 23 at the rear of the related bar 17 provides for transmitting forward movement of the links 20 to the bars 17 to rock the implement rig, or frame, upwardly on the draw bars 13 and thereby elevate the implements 9. Other apertures 28 in said rods 23 in front of the bars 17, and adapted to receive said pins provide for varying the degree of elevation of the implements 9 under uniform throw of the links 20 in a manner which will be readily understood.

The operating links 20 are designed to be swung by a power drive illustrated conventionally and comprising, in this instance, a pair of crank disks 29 rotatably mounted in any suitable manner on the transmission casing 30 in the rear of said links 20, respectively, and adapted to be driven by any suitable form of operating connections between the same and the power plant 5. The crank disks 29 are operatively connected to the links 20 by a pair of piston rods 31 one of which extends between each disk and its related link. The drive to the crank disks 29 may be controlled by any well-known type of clutch control. The precise type of control being unimportant to the present invention, such control has not been illustrated in the drawings.

The implements 9 are yieldingly held in the ground by a yielding connection extending between each link 20 and related bar 17 and comprising a bar 32 pivoted on and extending forwardly from the pivot 24 of each rod 23, and a tension spring 33 having one end connected to the front end of said link 20 as at 34, and its other end connected to the related bar 17 as at 35. As will be clear, the described yielding connection provides for vertical play of the implements 9 in the ground independently of movement of the links 20 and rods 23 thereby obviating breaking the implements in the event the latter encounter obstacles such as rocks or roots.

The operation of the invention will, it is believed, be clear from the foregoing without further explanation.

Manifestly the invention, as described, is susceptible of modification without departing from the inventive concept and right is herein reserved to all such modifications falling within the scope of the claims appended hereto.

What I claim is:

1. The combination with a tractor including a chassis and front and rear wheels, of an implement-carrying rig mounted below said chassis intermediate said front and rear wheels and pivotally connected to said chassis for vertical swinging movement, means for swinging said rig including a bar upstanding from said frame, a link swingably mounted on a fixed part of the tractor, means for swinging said link in opposite directions including a crank disk rotatably mounted on a fixed part of the tractor, a pitman rod connecting said disk to said link, a rod pivoted to said link and slidable in said bar, a pin in said last-mentioned rod on one side of said bar whereby movement of said link in one direction correspondingly moves said bar and swings said frame, and a yielding connection between said link and said bar whereby the latter and the frame are movable independently of said last-mentioned rod and tensioned against such independent movement.

2. The combination with a tractor including a chassis and front and rear wheels, of an implement-carrying rig mounted below said chassis intermediate said front and rear wheels and pivotally connected to said chassis for vertical swinging movement, means for swinging said rig including a bar upstanding from said frame, a link swingably mounted on a fixed part of the tractor, means for swinging said link in opposite directions, a rod pivoted to said link and slidable in said bar, a pin in said last-mentioned rod on one side of said bar whereby movement of said link in one direction correspondingly moves said bar and swings said frame, and a yielding connection between said link and said bar whereby the latter and the frame are movable independently of said last mentioned rod and tensioned against such independent movement.

JOSEPH PANCHERI.